(12) United States Patent
Buts et al.

(10) Patent No.: US 12,321,715 B2
(45) Date of Patent: Jun. 3, 2025

(54) METHOD AND SYSTEM FOR VERIFICATION OF RANDOM NUMBERS

(71) Applicant: JPMorgan Chase Bank, N.A., New York, NY (US)

(72) Inventors: Alexander Buts, Vernon Hills, IL (US); Marco Pistoia, Amawalk, NY (US); Dylan Herman, Woodcliff Lake, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 898 days.

(21) Appl. No.: 17/171,502

(22) Filed: Feb. 9, 2021

(65) Prior Publication Data

US 2021/0247963 A1 Aug. 12, 2021

Related U.S. Application Data

(60) Provisional application No. 62/972,445, filed on Feb. 10, 2020.

(51) Int. Cl.
*G06F 7/58* (2006.01)
(52) U.S. Cl.
CPC ..................... *G06F 7/58* (2013.01)
(58) Field of Classification Search
CPC ................................. G06F 7/58–588
See application file for complete search history.

(56) References Cited

U.S. PATENT DOCUMENTS

2010/0332574 A1* 12/2010 Herbert ............... G06F 9/30007
708/250
2017/0010865 A1 1/2017 Sanguinetti et al.
2017/0132465 A1 5/2017 Kutter et al.
2019/0250889 A1 8/2019 Brandao et al.

FOREIGN PATENT DOCUMENTS

WO WO 2019/132679 A1 7/2019

OTHER PUBLICATIONS

Stojiljkovic et al. "Efficient Pseudo-Random Generator for Homogeneous Filling of 2D arrays", SYM-OP-IS 2015: XLII International Symposium on Operations Research, 2015, pp. 265-268. http://symopis2015.matf.bg.ac.rs/ZbornikN.pdf (Year: 2015).*

(Continued)

*Primary Examiner* — Andrew Caldwell
*Assistant Examiner* — Carlo Waje
(74) *Attorney, Agent, or Firm* — Greenblum & Bernstein, P.L.C.

(57) ABSTRACT

A system and a method for verifying a randomness of an intended random number is provided. The method includes: accessing the intended random number; converting the intended random number into a bitmap image; analyzing the bitmap image with reference to a predetermined model; and using a result of the analyzing to determine whether the intended random number is a true random number or a pseudorandom number. The analysis of the bitmap image may be performed by using a machine learning image classification technique with respect to a model that is trained by using white noise images.

12 Claims, 5 Drawing Sheets

(56) References Cited

OTHER PUBLICATIONS

J. Postel-Pellerin et al., "True random number generation exploiting SET voltage variability in resistive RAM memory arrays," 2019 19th Non-Volatile Memory Technology Symposium (NVMTS), Durham, NC, USA, 2019, pp. 1-5, doi: 10.1109/NVMTS47818. 2019.9043369. (Year: 2019).*

Taskiran et al., "A novel memristive true random number generator design", COMPEL—The international journal for computation and mathematics in electrical and electronic engineering, vol. 38 No. 6, pp. 1931-1947. https://doi.org/10.1108/COMPEL-11-2018-046 (Year: 2019).*

Yan et al., "Revealing structure components of the retina by deep learning networks", 31st Conference on Neural Information Processing Systems (NIPS 2017), Long Beach, CA, USA. doi: https://doi.org/10.1101/216010 (Year: 2017).*

International Search Report and Written Opinion of the International Searching Authority in corresponding International Application No. PCT/US21/17238, dated Apr. 29, 2021.

* cited by examiner

METHOD AND SYSTEM FOR VERIFICATION OF RANDOM NUMBERS

CROSS-REFERENCE TO RELATED APPLICATIONS

This application claims the benefit of U.S. Provisional Patent Application Ser. No. 62/972,445, filed Feb. 10, 2020, which is hereby incorporated by reference in its entirety.

BACKGROUND

1. Field of the Disclosure

This technology generally relates to methods and systems for verifying a randomness of an intended random number that is generated by a random number generator.

2. Background Information

Random numbers are crucial for many aspects of communication infrastructure and configurations of components used for technological applications. In this regard, random numbers are often generated and used for encrypting data in order to protect the security of data, and also to protect security for various activities such as financial transactions. Random numbers are also often generated and used in conjunction with secure access token generators for cloud platforms.

A conventional approach to generating random numbers is to use a pseudorandom number generator. However, as suggested by the prefix "pseudo-", such numbers are not truly random. As a result, various issues have arisen in relation to the nonrandomness of such numbers, including a reduced degree of security in connection with their use, and a lack of uniqueness and a corresponding increased probability of duplication.

A preferred approach to generating a random number is to use a quantum computer or an outside source of entropy that represents randomness for generating the random number. In this regard, whereas the use of a pseudorandom number generator relies on the use of classical bits, i.e., zeros and ones, a quantum computer uses a "qubit", which uses the superposition phenomenon to effectively simultaneously have both values, i.e., zero and one.

The present inventor has recognized that in view of the shortcomings associated with the use of pseudorandom number generators, there is a need to verify a degree of randomness that is associated with a number that is intended to be random.

SUMMARY

The present disclosure, through one or more of its various aspects, embodiments, and/or specific features or sub-components, provides, inter alia, various systems, servers, devices, methods, media, programs, and platforms for verifying a randomness of an intended random number that is generated by a random number generator.

According to an aspect of the present disclosure, a method for verifying a randomness of an intended random number is provided. The method is implemented by at least one processor. The method includes: accessing, by the at least one processor, the intended random number; converting, by the at least one processor, the intended random number into a bitmap image; analyzing, by the at least one processor, the bitmap image with reference to a predetermined model; and using, by the at least one processor, a result of the analyzing to determine a randomness of the intended random number.

The analyzing may include using a machine learning technique to analyze the bitmap image.

The method may further include using a plurality of white noise images to train the predetermined model.

The determination of the randomness may include obtaining a numerical value that indicates a degree of randomness.

The using of the result of the analyzing to determine the randomness may include exactly one from among determining that the intended random number is a true random number and determining that the intended random number is a pseudorandom number.

When the intended random number is determined as being a true random number, the method may further include: generating a second bitmap image; and transforming the second bitmap image into a bit sequence that corresponds to the true random number.

The accessing of the intended random number may include receiving an output that is generated by a random number generator (RNG) that interfaces with a quantum computer that uses qubits.

The accessing of the intended random number may include receiving an output that is generated by a pseudorandom number generator.

The accessing of the intended random number may include receiving an output that is generated by an entropy source.

According to another exemplary embodiment, a computing apparatus for verifying a randomness of an intended random number is provided. The computing apparatus includes: a processor; a memory; and a communication interface coupled to each of the processor and the memory. The processor is configured to: access the intended random number; convert the intended random number into a bitmap image; analyze the bitmap image with reference to a predetermined model; and use a result of the analyzing to determine a randomness of the intended random number.

The processor may be further configured to use a machine learning technique to analyze the bitmap image.

The processor may be further configured to use a plurality of white noise images to train the predetermined model.

The processor may be further configured to use of the result of the analyzing to perform exactly one from among determining that the intended random number is a true random number and determining that the intended random number is a pseudorandom number.

When the intended random number is determined as being a true random number, the processor may be further configured to: generate a second bitmap image; and transform the second bitmap image into a bit sequence that corresponds to the true random number.

The processor may be further configured to access the intended random number by receiving, via the communication interface, an output that is generated by a random number generator (RNG) that interfaces with a quantum computer that uses qubits.

The processor may be further configured to access the intended random number by receiving, via the communication interface, an output that is generated by a pseudorandom number generator.

The processor may be further configured to access the intended random number by receiving, via the communication interface, an output that is generated by an entropy source.

According to yet another exemplary embodiment, a non-transitory computer readable storage medium storing instructions for verifying a randomness of an intended random number is provided. The storage medium includes executable code which, when executed by a processor, causes the processor to: access the intended random number; convert the intended random number into a bitmap image; analyze the bitmap image with reference to a predetermined model; and use a result of the analyzing to determine a randomness of the intended random number.

The executable code may further cause the processor to use the result of the analyzing to perform exactly one from among determining that the intended random number is a true random number and determining that the intended random number is a pseudorandom number.

Wherein when the intended random number is determined as being a true random number, the executable code may further cause the processor to: generate a second bitmap image; and transform the second bitmap image into a bit sequence that corresponds to the true random number.

The executable code may further cause the processor to access the intended random number by receiving an output that is generated by a random number generator (RNG) that interfaces with a quantum computer that uses qubits.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
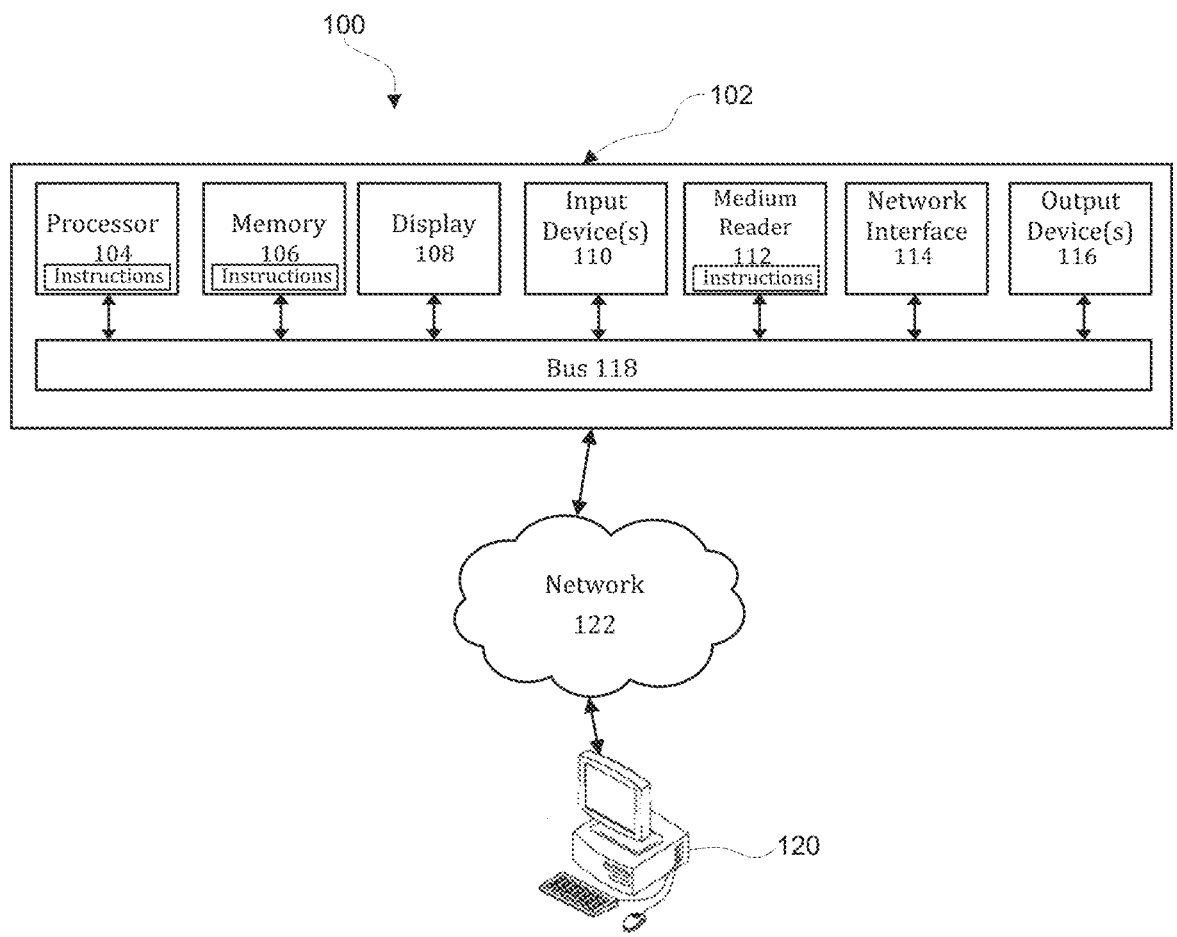
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 104 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for verifying a randomness of an intended random number that is generated by a random number generator.

Figure 2:
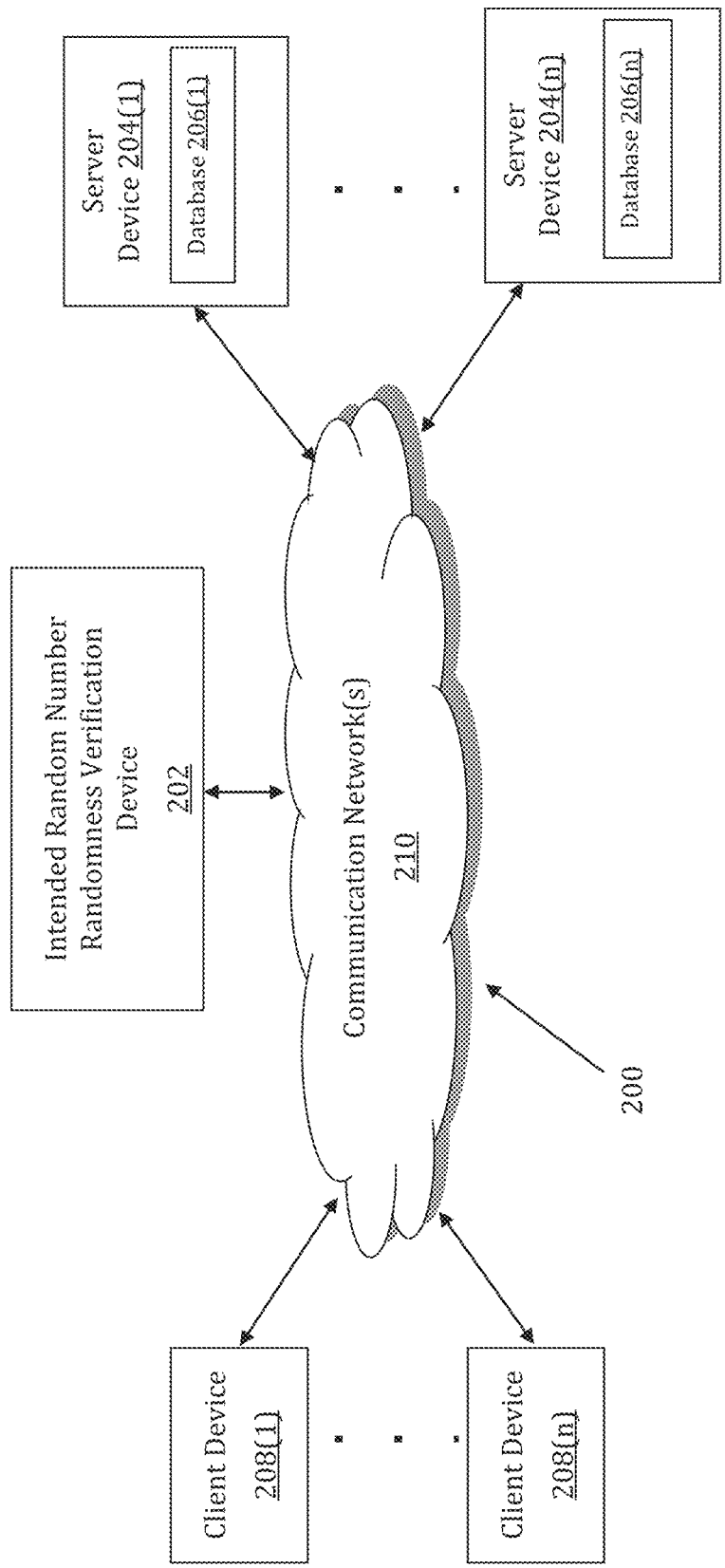
FIG. 2 illustrates an exemplary diagram of a network environment.

Referring to FIG. 2, a schematic of an exemplary network environment 200 for implementing a method for verifying a randomness of an intended random number that is generated by a random number generator is illustrated. In an exemplary embodiment, the method is executable on any networked computer platform, such as, for example, a personal computer (PC).

The method for verifying a randomness of an intended random number that is generated by a random number generator may be implemented by an Intended Random Number Randomness Verification (IRNRV) device 202. The IRNRV device 202 may be the same or similar to the computer system 102 as described with respect to FIG. 1. The IRNRV device 202 may store one or more applications that can include executable instructions that, when executed by the IRNRV device 202, cause the IRNRV device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the IRNRV device 202 itself, may be located in virtual server(s) running in a cloud-based computing environment rather than being tied to one or more specific physical network computing devices. Also, the application(s) may be running in one or more virtual machines (VMs) executing on the IRNRV device 202. Additionally, in one or more embodiments of this technology, virtual machine(s) running on the IRNRV device 202 may be managed or supervised by a hypervisor.

In the network environment 200 of FIG. 2, the IRNRV device 202 is coupled to a plurality of server devices 204(1)-204(n) that hosts a plurality of databases 206(1)-206(n), and also to a plurality of client devices 208(1)-208(n) via communication network(s) 210. A communication interface of the IRNRV device 202, such as the network interface 114 of the computer system 102 of FIG. 1, operatively couples and communicates between the IRNRV device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the IRNRV device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and IRNRV devices that efficiently implement a method for verifying a randomness of an intended random number that is generated by a random number generator.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The IRNRV device 202 may be a standalone device or integrated with one or more other devices or apparatuses, such as one or more of the server devices 204(1)-204(n), for example. In one particular example, the IRNRV device 202 may include or be hosted by one of the server devices 204(1)-204(n), and other arrangements are also possible. Moreover, one or more of the devices of the IRNRV device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the IRNRV device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to bit map images and machine learning models used for analyzing randomness of numbers generated by random number generators.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the IRNRV device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the IRNRV device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the IRNRV device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the IRNRV device 202, the server devices 204(1)-204(n), or the client devices 208(1)-208(n), for example, may be configured to operate as virtual instances on the same physical machine. In other words, one or more of the IRNRV device 202, the server devices 204(1)-204(n), or the client devices 208(1)-208(n) may operate on the same physical device rather than as separate devices communicating through communication network(s) 210. Additionally, there may be more or fewer IRNRV devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
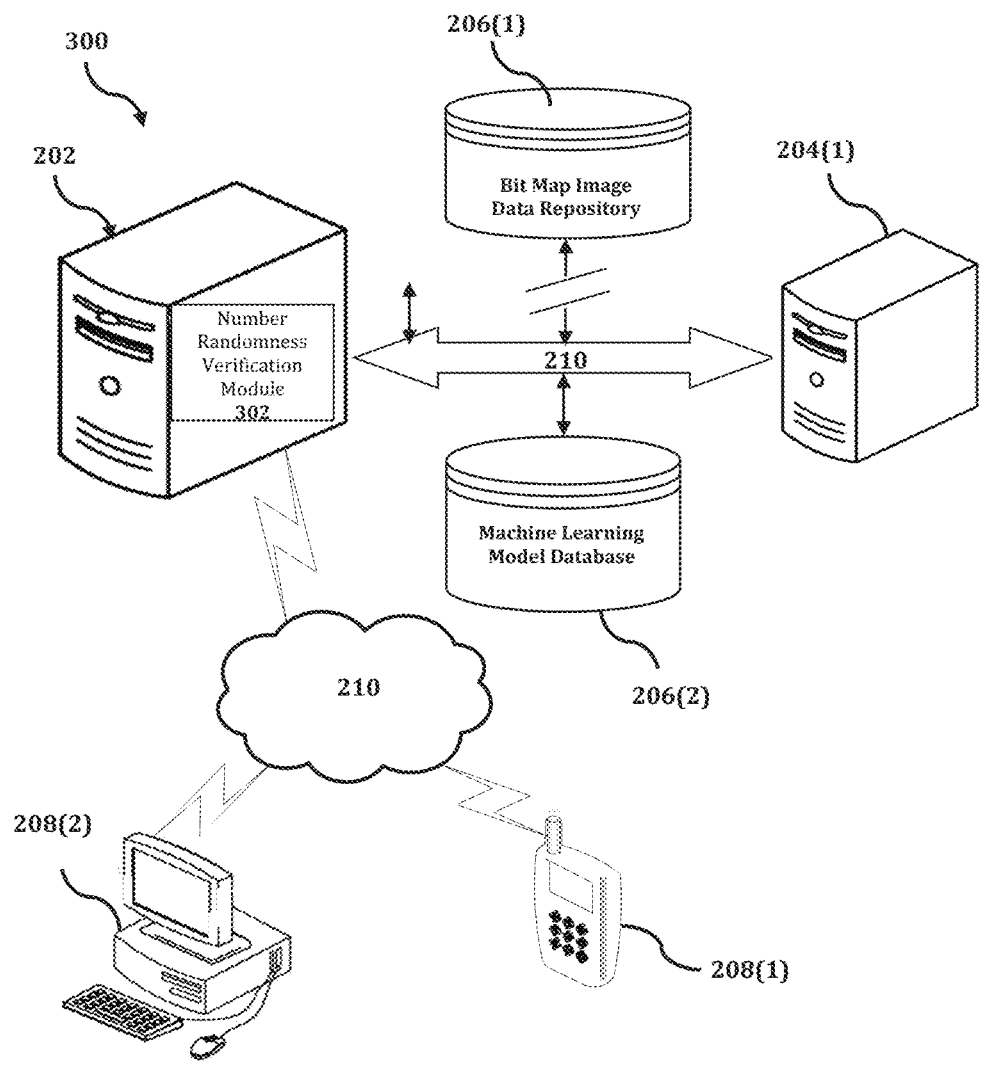
FIG. 3 shows an exemplary system for implementing a method for verifying a randomness of an intended random number that is generated by a random number generator.

The IRNRV device 202 is described and illustrated in FIG. 3 as including a number randomness verification module 302, although it may include other rules, policies, modules, databases, or applications, for example. As will be described below, the number randomness verification module 302 is configured to implement a method for verifying a randomness of an intended random number.

An exemplary process 300 for implementing a mechanism for verifying a randomness of an intended random number by utilizing the network environment of FIG. 2 is illustrated as being executed in FIG. 3. Specifically, a first client device 208(1) and a second client device 208(2) are illustrated as being in communication with IRNRV device 202. In this regard, the first client device 208(1) and the second client device 208(2) may be "clients" of the IRNRV device 202 and are described herein as such. Nevertheless, it is to be known and understood that the first client device 208(1) and/or the second client device 208(2) need not necessarily be "clients" of the IRNRV device 202, or any entity described in association therewith herein. Any additional or alternative relationship may exist between either or both of the first client device 208(1) and the second client device 208(2) and the IRNRV device 202, or no relationship may exist.

Further, IRNRV device 202 is illustrated as being able to access a bit map image data repository 206(1) and a machine learning model database 206(2). The random number randomness verification module 302 may be configured to access these databases for implementing a method for verifying a randomness of an intended random number.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the IRNRV device 202 via broadband or cellular communication. Of course, these embodiments are merely exemplary and are not limiting or exhaustive.

Upon being started, the number randomness verification module 302 executes a process for verifying the randomness of an intended random number. An exemplary process for verifying the randomness of an intended random number is generally indicated at flowchart 400 in FIG. 4.

Figure 4:
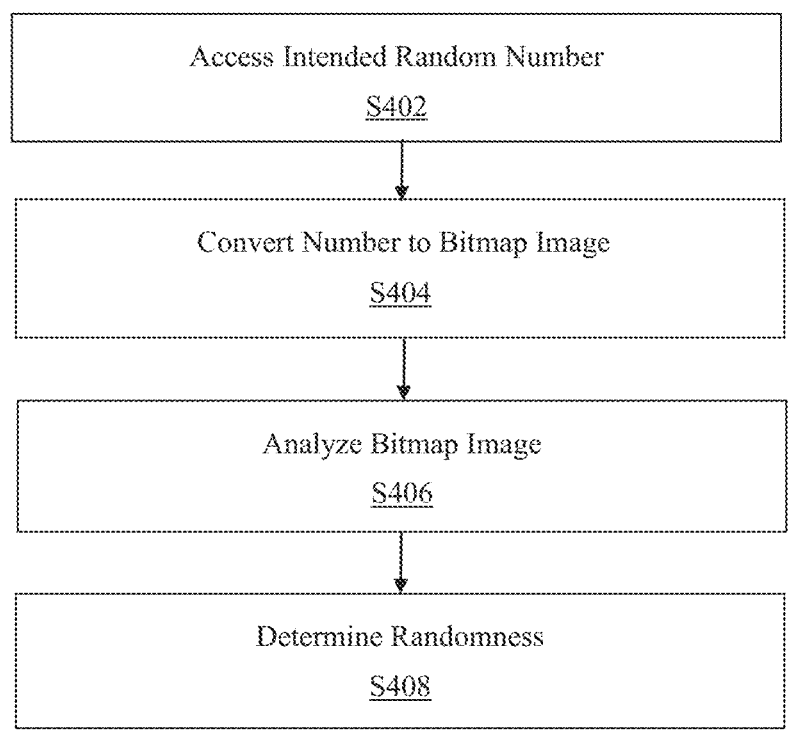
FIG. 4 is a flowchart of an exemplary process for implementing a method for verifying a randomness of an intended random number that is generated by a random number generator.

In process 400 of FIG. 4, at step S402, an intended random number is accessed by the number randomness verification module 302. In an exemplary embodiment, the intended random number may be generated by a random number generator or a pseudorandom number generator, and the accessing of the number may be performed by receiving an output thereof. In another exemplary embodiment, the intended random number may be received from an external source, such as, for example, an external source of entropy. The external source of entropy may include any one or more of a source of cosmic rays, a white noise generator, and/or a television broadcast signal.

At step S404, the intended random number is converted into a bitmap image. Then, at step S406, the bitmap image is analyzed with reference to a predetermined model. In an exemplary embodiment, the analysis of the bitmap image is performed by using a machine learning technique by which the model is trained by using white noise images.

At step S408, a randomness determination is made. In an exemplary embodiment, the randomness determination is based on a result of the analysis of the bitmap image. In an exemplary embodiment, the result of the bitmap image analysis is converted into a numerical value that indicates a degree of randomness of the generated intended random number. In an exemplary embodiment, the randomness determination may be expressed as an indication as to whether the generated number is or is not a "true" random number, i.e., whether the generated number is a true random number or a pseudorandom number.

Figure 5:
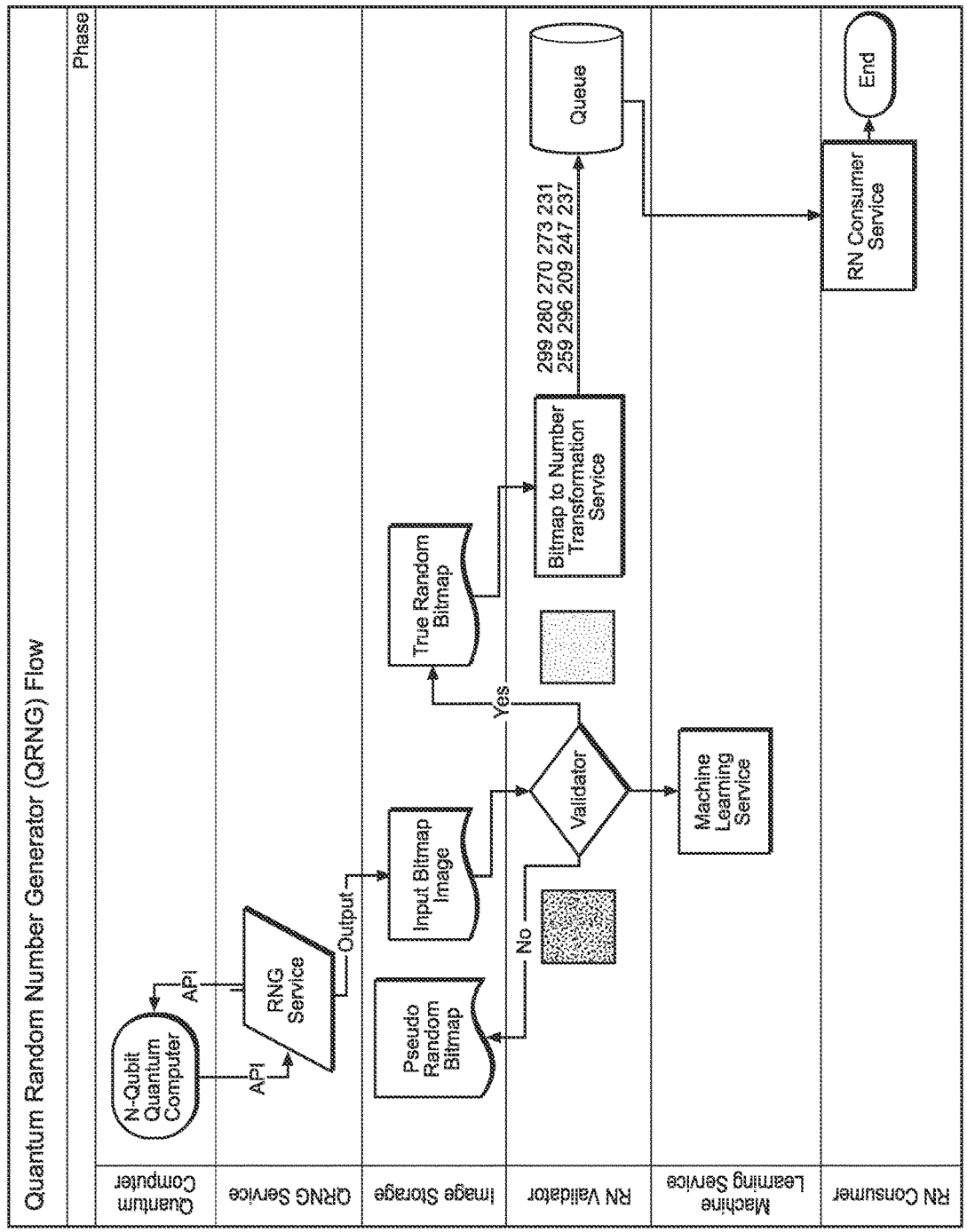
FIG. 5 is a data flow diagram that illustrates a process for generating a random number and verifying its randomness, according to an exemplary embodiment.

FIG. 5 is a data flow diagram 500 that illustrates a process for generating a random number and verifying its randomness, according to an exemplary embodiment. Referring to FIG. 5, a quantum computer (labeled "N-Qubit") that uses qubits may interface with a intended-random number generator (labeled "RNG Service") via an application programming interface (labeled "API") in order to generate an intended random number. The generated number is then converted into a bitmap image (labeled "Input Bitmap Image"), which is then processed by applying a validator function (labeled "Validator") in order to determine a measure of randomness. The application of the validator function may effectively implement a machine learning technique that entails comparing the bitmap image to a model that has been trained by using white noise images.

As a result of applying the validator function to the bitmap image, two potential result images (labeled "Pseudo Random Bitmap" and "True Random Bitmap") are shown. In this aspect, if the validator function determines that the input bitmap image is not a true random image, then it outputs the Pseudo Random Bitmap; and if the validator function determines that the input bitmap image is a true random image, then it outputs the True Random Bitmap. The True Random Bitmap image is then used as an input to a transformation function (labeled "Bitmap to Number Transformation Service"), which yields an output "true" random number that corresponds to the image. The random number is then sent to a queue (labeled "Queue") and then displayed on a user interface (labeled "RN Consumer Service").

Accordingly, with this technology, an optimized process for verifying a randomness of an intended random number that is generated by a random number generator is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for verifying a randomness of an intended random number, the method being implemented by at least one processor, the method comprising:
    accessing, by the at least one processor, the intended random number by using a random number generator (RNG) that interfaces with a quantum computer to generate an output;
    converting, by the at least one processor, the intended random number into a bitmap image;
    analyzing, by the at least one processor via a validator function using a machine learning technique, the bitmap image with reference to a predetermined model that is trained using a plurality of white noise images, wherein the machine learning technique compares the bitmap image to the predetermined model to determine the randomness of the intended random number;
    displaying, by the at least one processor and based on a result of the analyzing, the determined randomness on a display of a user interface;
    responsive to a determination that the bitmap image is not a true random image, outputting, by the at least one processor via the validator function, a pseudo random bitmap; and
    responsive to a determination that the bitmap image is a true random image, outputting, by the at least one processor via the validator function, a true random bitmap, transmitting, by the at least one processor, the true random bitmap to a transformation function, and generating, by the at least one processor via the transformation function, a true random number that corresponds to the true random bitmap.

2. The method of claim 1, wherein the analyzing to determine the randomness comprises determining that the intended random number is a true random number.

3. The method of claim 2, further comprising:
    generating a second bitmap image; and
    transforming the second bitmap image into a bit sequence that corresponds to the true random number.

4. The method of claim 1, wherein the quantum computer uses qubits in order to generate the output.

5. A computing apparatus for verifying a randomness of an intended random number, the computing apparatus comprising:
    a processor;
    a memory; and
    a communication interface coupled to each of the processor and the memory,
    wherein the processor is configured to:
        access the intended random number by using a random number generator (RNG) that interfaces with a quantum computer to generate an output;
        convert the intended random number into a bitmap image;
        analyze, via a validator function using a machine learning technique, the bitmap image with reference to a predetermined model that is trained using a plurality of white noise images, wherein the machine learning technique compares the bitmap image to the predetermined model to determine the randomness of the intended random number; and
        display, based on a result of the analyzing, the determined randomness on a display of a user interface;
        responsive to a determination that the bitmap image is not a true random image, output, via the validator function, a pseudo random bitmap; and
        responsive to a determination that the bitmap image is a true random image, output, via the validator function, a true random bitmap, transmit the true random bitmap to a transformation function, and generate, via the transformation function, a true random number that corresponds to the true random bitmap.

6. The computing apparatus of claim 5, wherein the processor is further configured to determine that the intended random number is a true random number.

7. The computing apparatus of claim 6, wherein the processor is further configured to:
    generate a second bitmap image; and
    transform the second bitmap image into a bit sequence that corresponds to the true random number.

8. The computing apparatus of claim 5, wherein the quantum computer uses qubits in order to generate the output.

9. A non-transitory computer readable storage medium storing instructions for verifying a randomness of an intended random number, the storage medium comprising executable code which, when executed by a processor, causes the processor to:
    access the intended random number by using a random number generator (RNG) that interfaces with a quantum computer to generate an output;
    convert the intended random number into a bitmap image;
    analyze, via a validator function using a machine learning technique, the bitmap image with reference to a predetermined model that is trained using a plurality of white noise images, wherein the machine learning technique compares the bitmap image to the predetermined model to determine the randomness of the intended random number; and
    display, based on a result of the analyzing, the determined randomness on a display of a user interface;
    responsive to a determination that the bitmap image is not a true random image, output, via the validator function, a pseudo random bitmap;
    responsive to a determination that the bitmap image is a true random image, output, via the validator function, a true random bitmap, transmit the true random bitmap to a transformation function, and generate, via the transformation function, a true random number that corresponds to the true random bitmap.

10. The storage medium of claim 9, wherein the executable code further causes the processor to determine that the intended random number is a true random number.

11. The storage medium of claim 10, wherein the executable code further causes the processor to:
    generate a second bitmap image; and
    transform the second bitmap image into a bit sequence that corresponds to the true random number.

12. The storage medium of claim 9, wherein the quantum computer uses qubits in order to generate the output.

* * * * *